D. BURKHARDT.
CAKE MAKING MACHINE.
APPLICATION FILED APR. 4, 1910.
989,831.
Patented Apr. 18, 1911.
3 SHEETS—SHEET 3.
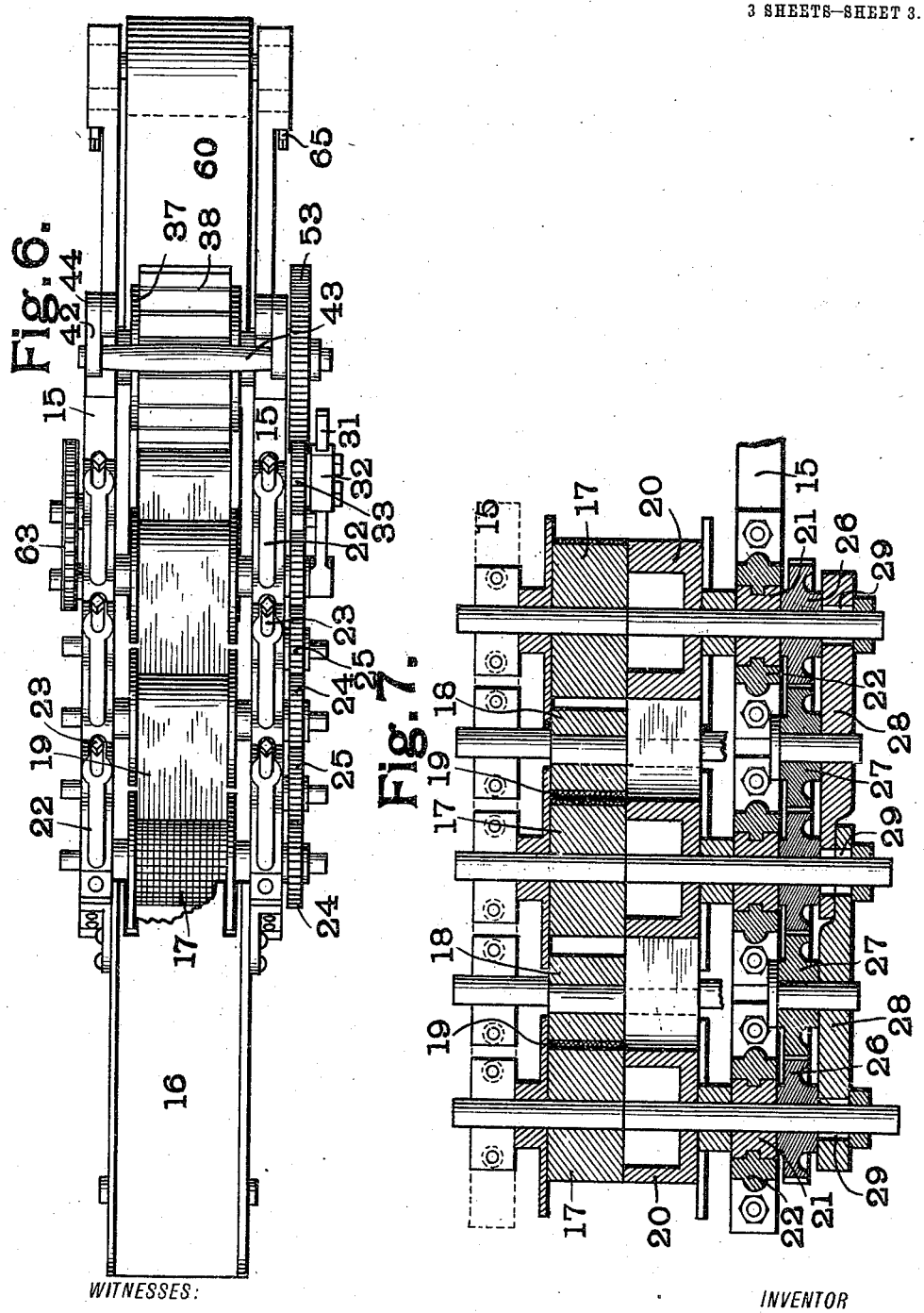
WITNESSES:
L. L. Mead.
W. A. Alexander
INVENTOR
Daniel Burkhardt
BY
Fowler & Huffman
ATTORNEYS

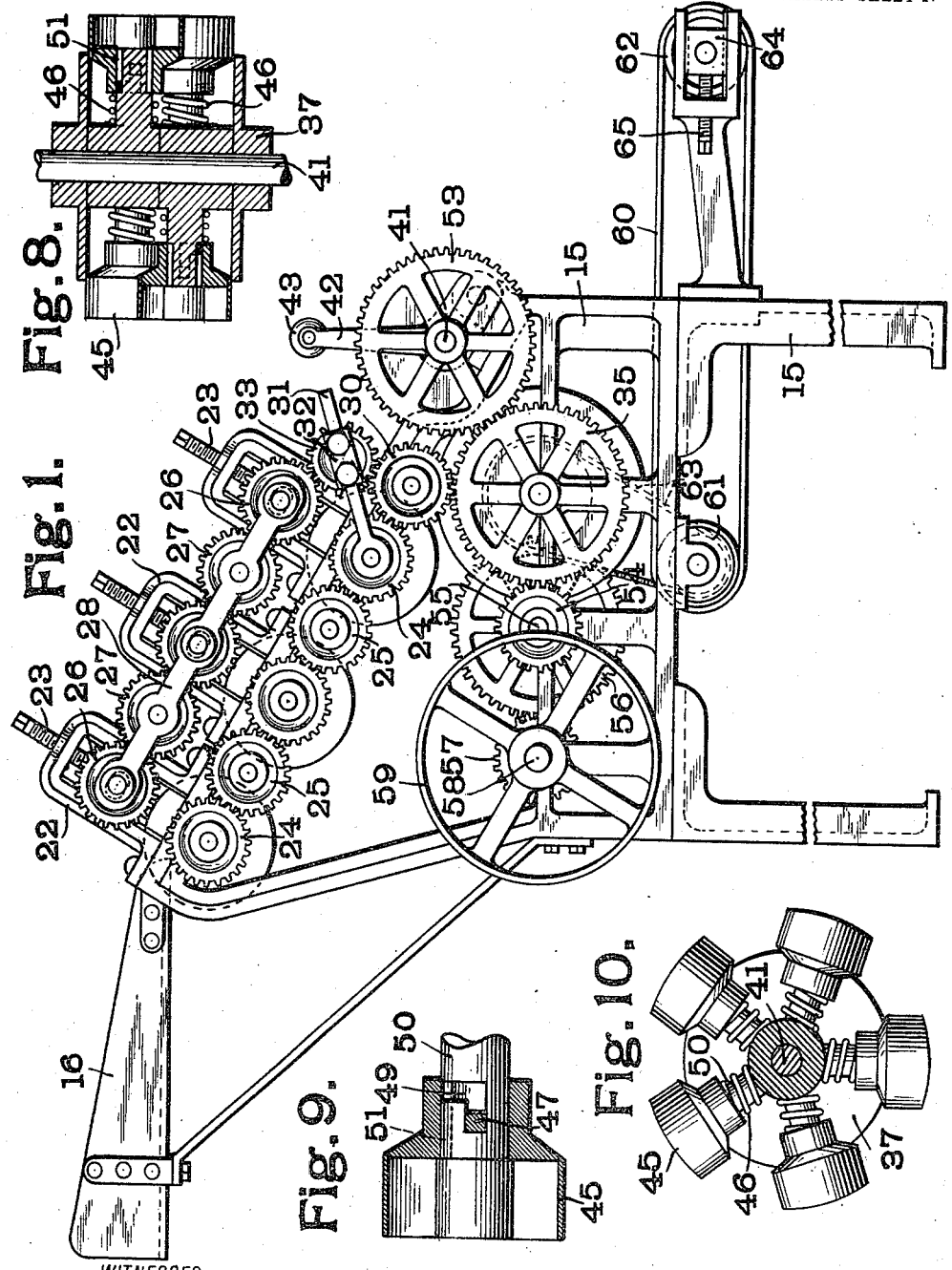

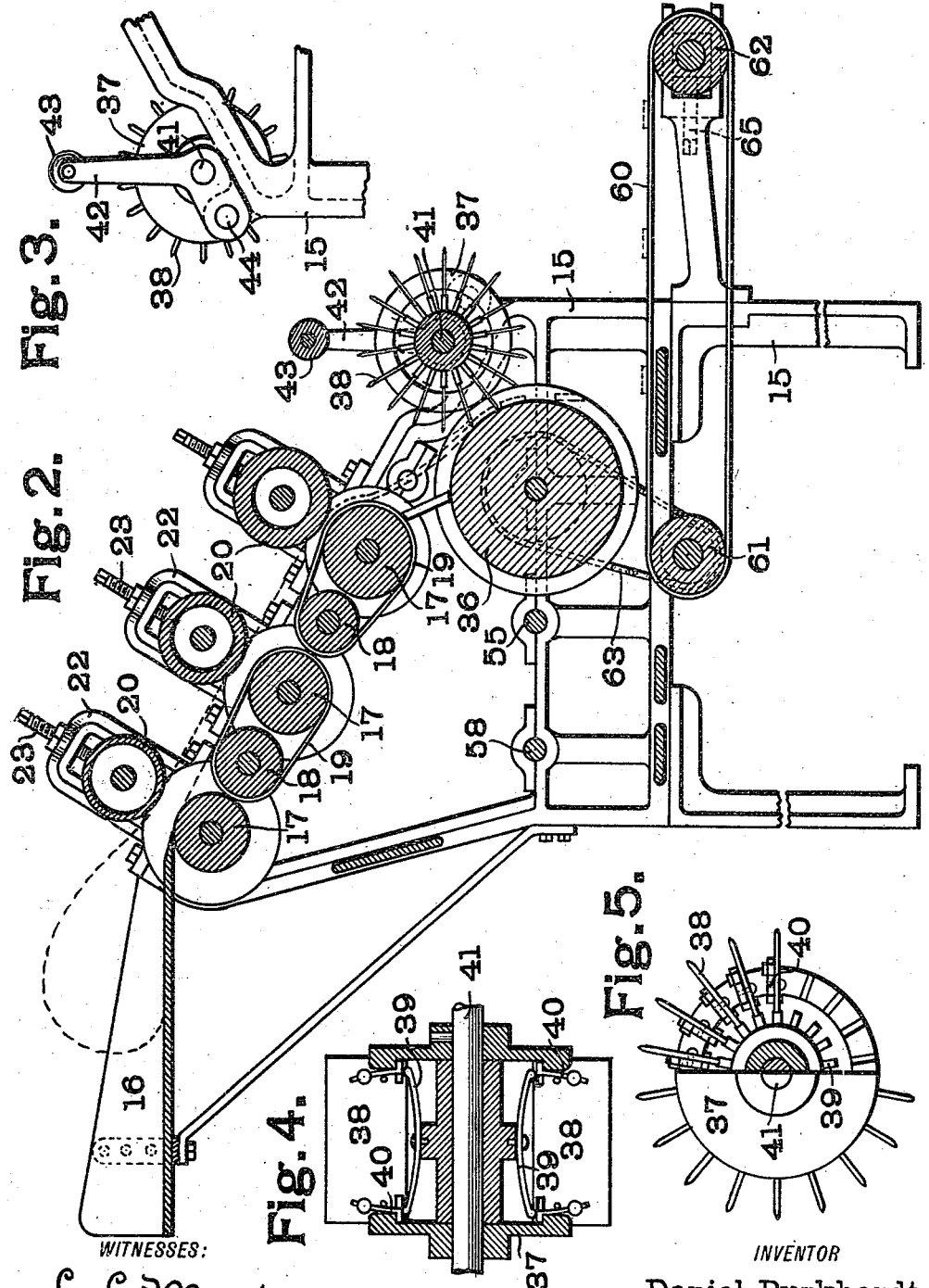

UNITED STATES PATENT OFFICE.

DANIEL BURKHARDT, OF ST. LOUIS, MISSOURI.

CAKE-MAKING MACHINE.

989,831.  Specification of Letters Patent.  Patented Apr. 18, 1911.

Application filed April 4, 1910. Serial No. 553,246.

*To all whom it may concern:*

Be it known that I, DANIEL BURKHARDT, a citizen of the United States of America, residing at the city of St. Louis, Missouri, have invented a certain new and useful Cake-Making Machine, of which the following is such a full, clear, and exact description as will enable any one skilled in the art to which it appertains to make and use the same, reference being had to the accompanying drawings, forming part of this specification.

My invention relates to a cake making machine and particularly to a machine which will roll the dough into a uniform layer and cut same into the desired form to produce cakes.

In the accompanying drawings which illustrate one form of machine made in accordance with my invention Figure 1 is a side elevation; Fig. 2 is a vertical longitudinal section; Fig. 3 is a detail view showing the manner of throwing the cutting head toward and away from the cutting block; Figs. 4 and 5 are enlarged detail views of the cutter head; Fig. 6 is a top plan view the upper set of rolls being removed to better show the remaining parts of the machine; Fig. 7 is an enlarged sectional view of the reducing rolls, and Figs. 8, 9 and 10 are detail views showing a modified form of cutter head.

Like marks of reference refer to similar parts in the several views in the drawings.

15 represents the frame-work of the machine. Carried at the upward and forward end of the frame-work 15 is a trough 16 adapted to receive the dough. From the trough 16 the dough is fed between two sets of reducing rolls which will now be described. The lower set of reducing rolls consists of three rolls 17 which are arranged in an inclined position as best shown in Fig. 2. Arranged between the rolls 17 are a pair of rolls 18 which are connected to two of the rolls 17 by means of belts 19 so that the entire set of rolls forms practically a continuous conveyer for the dough. Arranged above the rolls 17 are adjustable rolls 20 which coöperate with the rolls 17 to reduce the dough to a thin uniform layer. It is necessary to independently adjust each of the rolls 20 in order to secure the desired reduction of the dough. The journals of the rolls 20 are arranged in boxes 21 (Fig. 7) sliding in guideways 22. Threaded rods 23 are connected to the boxes for raising and lowering the same and thus adjust the rolls 20 toward and away from the rolls 17. The rolls 17 are driven by means of gear wheels 24 between each pair of which is arranged an idle wheel 25. The rolls 18 are driven only by the belts 19. In order to drive the rolls 20 the journal of each of said rolls is provided with a spur wheel 26 between each pair of which is arranged an idle wheel 27. The idle wheels 27 are carried by bars 28 extending between the rolls 20. In order to allow for the independent adjustment of the rolls 20 these bars 28 are slotted as at 29, as best shown in Fig. 7. These slots 29 allow sufficient play between the bars and rolls to enable each roll to be independently adjusted toward and away from the corresponding roll 20. Meshing with the wheel 24 on the lower roll 17 is an idle wheel 30. In order to communicate the movement from this idle wheel 30 to the wheel 26 on the lower roll 20 the shaft of the lower roll 17 has pivoted on it an arm 31 on which is slidingly mounted a block 32 carrying an idle wheel 33 adapted to mesh with both the wheel 30 and the lower wheel 26. Owing to the manner of mounting this wheel the wheel can be brought into perfect mesh with both of the wheels and at the same time allow of the adjustment with the lower roll 20 hereinbefore referred to.

The idle wheel 30 is driven from a gear wheel 35 mounted upon the shaft of the cutting block 36. Coöperating with this cutting block 36 is a cutter head 37 shown in detail in Figs. 4 and 5. The cutter head 37 is provided with a number of radially sliding blades 38 adapted to coöperate with the block 36. Each of these blades 38 is normally forced outwardly by means of a spring 39. When, however, the blade comes in contact with the cutter block 36 it will be forced inwardly with the spring 39 and thus sufficient force will be exerted between the blade and block to sever the dough. The blades 38 are prevented from being forced out of the cutter head by means of spring detents 40. By releasing these detents 40 the blades can be removed for sharpening or any other purpose. The cutter head 37 is carried on a shaft 41 which is mounted in bent arms 42 provided with a cross handle 43. The arms 42 are pivoted to the frame 15 at 44, as best shown in Fig. 3. By grasping the handle 43 the cutter head may be swung toward and away from the cutting block 36.

In Figs. 8, 9 and 10 I have shown a modification of the cutter head 37 in which the straight blades 38 are replaced by circular blades 45. These circular blades 45 are arranged to slide radially in the same manner as the blades 38. They are normally held in their outer position by means of coil springs 46, as shown in Figs. 8 and 10. Lugs 47 carried by the blades 45 engage with slots 49 in spindles 50 carried by the cutter head so that the blades may be removed by turning them one-quarter revolution to bring the said lugs 47 into alinement with extensions 51 of the curve 50. The operation of these circular knives is the same as that of the straight knives 38 except that they cut the dough into circular cakes instead of rectangular ones.

The cutter head 37 is provided with a spur wheel 53 which engages with the spur wheel 35 on the shaft of the cutting block. This spur wheel is driven from a smaller spur wheel 54 on a shaft 55 carried in the frame 15 of the machine. This shaft 55 also has mounted upon it a second spur wheel 56 which engages with a spur wheel 57 on a shaft 58. The shaft 58 is also provided with a belt wheel 59 which may be driven from any suitable source of power. Arranged below the cutter block 36 is an endless conveyer 60 passing around rolls 61 and 62. The roll 61 is driven by a sprocket chain 63 passing around sprocket wheels on the end of the cutting block shaft and the shaft of the said roll 61. In order to tighten the conveyer 60 the shaft of the roll 62 is mounted in sliding blocks 64, as best shown in Fig. 1. These blocks 64 are adjusted by means of screw-headed rods 65. The conveyer 60 serves to carry the severed pieces of dough away from the cutting block.

The operation of my machine will be evident from the above description.

The dough is placed in the trough 16 and fed between the two sets of rolls 17 and 20. The rolls 20 may each be independently adjusted toward and away from the corresponding rolls 17 so as to secure a suitable and uniform reduction of the mass of dough into a thin sheet of material. The sheet of material is cut into pieces of uniform size and shape by means of the knives carried by the cutter head 37. As the cutter head 37 is arranged to swing toward and away from the cutting block 36 access is easily had to the cutting block for cleaning the same and at the same time the knives are easily removed for cleaning and sharpening.

Having fully described my invention, what I claim as new and desire to secure by Letters Patent of the United States, is:

1. In a cake making machine, the combination with a set of rolls, of a second set of rolls arranged adjacent to said first set, a plurality of slotted bars extending between the rolls of said second set and carrying idle wheels for transmitting motion from one roll to another, and means for independently adjusting each of the rolls of said second set toward and away from said first set.

2. In a cake making machine, the combination with a rotary cutting block, of a rotary cutter head, a plurality of knives yieldingly carried by said cutter head and adapted to coöperate with said cutting block, and means for feeding dough between said cutter head and block.

3. In a cake making machine, the combination with a rotary cutting block, of a rotary cutter head pivoted to swing toward and away from said cutting block, a plurality of knives yieldingly carried by said head and adapted to coöperate with said block, and means for feeding dough between said cutter head and block.

4. In a cake making machine, the combination with an inclined set of rolls, of a second set of rolls arranged adjacent to said first set, means for independently adjusting each of the rolls of said second set toward and away from said first set, a rotary cutting block receiving the dough from said rolls, a rotary cutter head pivoted to swing toward and away from said cutter block, knives yieldingly carried by said cutter head, and gearing for driving said rolls, cutter head and cutting block.

In testimony whereof, I have hereunto set my hand and affixed my seal in the presence of the two subscribing witnesses.

DANIEL BURKHARDT. [L. S.]

Witnesses:
W. A. ALEXANDER,
ELIZABETH BAILEY.

---

Copies of this patent may be obtained for five cents each, by addressing the "Commissioner of Patents, Washington, D. C."